No. 748,938. PATENTED JAN. 5, 1904.
N. D. FAIRCHILD.
MONKEY WRENCH.
APPLICATION FILED MAY 19, 1903.
NO MODEL.

Witnesses
Milton Lenoir.

Inventor
Nelson D. Fairchild
by Addison G. DuBois
his Attorney

No. 748,938. Patented January 5, 1904.

UNITED STATES PATENT OFFICE.

NELSON D. FAIRCHILD, OF OLEAN, NEW YORK.

MONKEY-WRENCH.

SPECIFICATION forming part of Letters Patent No. 748,938, dated January 5, 1904.

Application filed May 19, 1903. Serial No. 157,809. (No model.)

*To all whom it may concern:*

Be it known that I, NELSON D. FAIRCHILD, a citizen of the United States, and a resident of Olean, in the county of Cattaraugus and State of New York, have invented a new and useful Improvement in Monkey-Wrenches, of which the following is a specification.

My invention relates to an improvement in so-called "monkey-wrenches," the object being to provide a quick-acting wrench which will be strong and durable and effective in its work.

With these objects in view my invention consists in a wrench in which there is the usual fixed and sliding jaws in connection with a dog pivoted in the sliding jaw and spring-actuated to engage the bar of the wrench, thus locking the dog against sliding in one direction unless released by the operator when occasion arises for resetting the sliding or adjustable jaw. In other words, the construction is such that the adjustable or sliding jaw is capable of being moved freely on the bar in one direction and adapted to be unlocked for adjustment in the opposite direction.

My invention still further consists in certain novel features of construction and combinations of parts, which will be hereinafter described, and pointed out in the claims.

Figure 1:
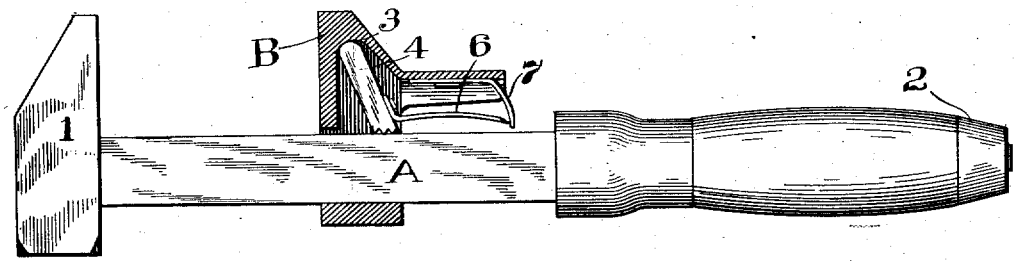
Figure 2:
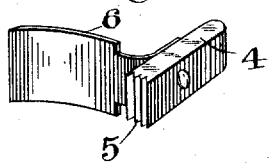
Figure 3:
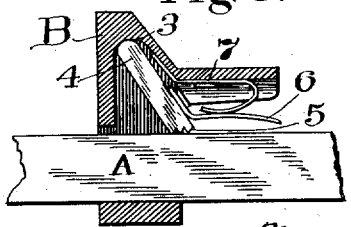

In the accompanying drawings, Figure 1 is a view in elevation with parts broken away to show the internal mechanism of the adjustable or sliding jaw. Fig. 2 is a detail, and Fig. 3 is a modification.

A represents the main bar or shank of the wrench, its surface being preferably perfectly smooth. On one end the usual fixed jaw 1 is secured, and on the opposite end the bar is provided with a handle, preferably held thereon by a nut 2.

B is the sliding jaw, preferably cored out, as indicated in the drawings, and adapted to receive and slide upon the bar A in the usual fashion, whereby it may be adjusted on the bar to the size of the nut to be turned. In the cored interior a bearing 3 is formed, and in this bearing the rounded end of the pawl or dog 4 is adapted to be seated. This pawl or dog is provided with a toothed outer edge 5, which engages the edge of the bar A to lock the sliding jaw in position. The normal position of the dog is at an angle to the bar A, as shown, so that outward pressure upon the sliding jaw B tends to rock the dog to a position at right angles to the bar, thus causing the teeth 5, which normally are approximately parallel to the bar, to be rocked rigidly against the bar to lock the sliding jaw thereto. The normal inclination also admits of the sliding jaw being slid toward the rigid jaw without the necessity of manipulating the dog. A thumb-piece 6 extends outwardly from the dog in position to be raised by the operator when he desires to slide the jaw back in a direction away from the rigid jaw for readjustment. A spring 7 engages the thumb-piece 6, whereby to retain the dog yieldingly in its normal position. The dog is entirely housed within the sliding jaw, the thumb-piece only projecting far enough out to be engaged by the operator when he desires to reset the sliding jaw.

From the foregoing it will be that only a moment's time is required to set the adjustable sliding jaw in either direction, and to force it against the nut to be turned it is merely slid thereagainst without the necessity of manipulating the thumb-piece. The opposite adjustment, however, requires simply the lifting of the thumb-piece to withdraw the teeth 5 from the surface of the bar A, the dog being returned to its locking position by the action of the spring 7. The wrench is powerful in action, simple in the number of its parts, compactly arranged, and easy and quick of adjustment and manipulation and may be produced at a small initial cost.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. As an article of manufacture, a wrench comprising a shank, a fixed and a hollow sliding jaw supported on the shank, the sliding jaw provided with an apron, a dog located and wholly contained within the sliding jaw, an independent resilient thumb-piece secured to the dog, the thumb-piece extending beneath and protected by the apron and means engaging the thumb-piece to normally retain the dog in engagement with the shank.

2. A wrench comprising a shank, a fixed and a sliding jaw each supported on the shank, the sliding jaw being hollow and provided with an apron, a dog located and having a bearing within the sliding jaw, a resilient thumb-piece projecting from the dog and beneath the apron, and a spring carried by the apron and engaging the thumb-piece to retain the dog normally in engagement with the shank.

In testimony whereof I have signed this specification in the presence of two subscribing witnesses.

NELSON D. FAIRCHILD.

Witnesses:
A. L. TOZIER,
C. S. DWINELLS.

---

It is hereby certified that Letters Patent No. 748,938, granted January 5, 1904, upon the application of Nelson D. Fairchild, of Olean, New York, for an improvement in "Monkey-Wrenches," were erroneously issued to said Fairchild, whereas said Letters Patent should have been issued to *Stella D. Fairchild, administratrix of said Nelson D. Fairchild, deceased*, as shown by the records of this office; and that the said Letters Patent should be read with this correction therein that the same may conform to the record of the case in the Patent Office.

Signed and sealed this 2d day of February, A. D., 1904.

[SEAL.]

F. I. ALLEN,
*Commissioner of Patents.* beneath and protected by the apron and means engaging the thumb-piece to normally retain the dog in engagement with the shank.

2. A wrench comprising a shank, a fixed and a sliding jaw each supported on the shank, the sliding jaw being hollow and provided with an apron, a dog located and having a bearing within the sliding jaw, a resilient thumb-piece projecting from the dog and beneath the apron, and a spring carried by the apron and engaging the thumb-piece to retain the dog normally in engagement with the shank.

In testimony whereof I have signed this specification in the presence of two subscribing witnesses.

NELSON D. FAIRCHILD.

Witnesses:
A. L. TOZIER,
C. S. DWINELLS.

---

Correction in Letters Patent No. 748,938.

It is hereby certified that Letters Patent No. 748,938, granted January 5, 1904, upon the application of Nelson D. Fairchild, of Olean, New York, for an improvement in "Monkey-Wrenches," were erroneously issued to said Fairchild, whereas said Letters Patent should have been issued to *Stella D. Fairchild, administratrix of said Nelson D. Fairchild, deceased*, as shown by the records of this office; and that the said Letters Patent should be read with this correction therein that the same may conform to the record of the case in the Patent Office.

Signed and sealed this 2d day of February, A. D., 1904.

[SEAL.]

F. I. ALLEN,
*Commissioner of Patents.*

Correction in Letters Patent No. 748,938.

It is hereby certified that Letters Patent No. 748,938, granted January 5, 1904, upon the application of Nelson D. Fairchild, of Olean, New York, for an improvement in "Monkey-Wrenches," were erroneously issued to said Fairchild, whereas said Letters Patent should have been issued to *Stella D. Fairchild, administratrix of said Nelson D. Fairchild, deceased*, as shown by the records of this office; and that the said Letters Patent should be read with this correction therein that the same may conform to the record of the case in the Patent Office.

Signed and sealed this 2d day of February, A. D., 1904.

[SEAL.]
F. I. ALLEN,
*Commissioner of Patents.*